(12) United States Patent
Barcia

(10) Patent No.: US 7,536,409 B2
(45) Date of Patent: May 19, 2009

(54) HAVING A SINGLE SET OF OBJECT RELATIONAL MAPPINGS ACROSS DIFFERENT INSTANCES OF THE SAME SCHEMAS

(75) Inventor: Roland Barcia, Leonia, NJ (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 11/058,036

(22) Filed: Feb. 15, 2005

(65) Prior Publication Data

US 2006/0184568 A1 Aug. 17, 2006

(51) Int. Cl.
*G06F 17/30* (2006.01)

(52) U.S. Cl. .............................. 707/102; 707/3; 707/4; 707/10; 707/101; 707/103 Y

(58) Field of Classification Search ...................... 707/3, 707/4, 10, 101, 102, 103 Y
See application file for complete search history.

(56) References Cited

U.S. PATENT DOCUMENTS

| | | | | | |
|---|---|---|---|---|---|
| 5,504,885 | A | * | 4/1996 | Alashqur | .................... 717/141 |
| 5,873,093 | A | * | 2/1999 | Williamson et al. | ..... 707/103 R |
| 5,970,490 | A | * | 10/1999 | Morgenstern | ................. 707/10 |
| 6,035,298 | A | * | 3/2000 | McKearney | ................... 707/10 |
| 6,470,354 | B1 | * | 10/2002 | Aldridge et al. | .......... 707/103 Y |
| 6,591,272 | B1 | * | 7/2003 | Williams | ..................... 707/102 |
| 2002/0023091 | A1 | * | 2/2002 | Silberberg et al. | ....... 707/103 Y |
| 2002/0095423 | A1 | | 7/2002 | Dessloch et al. | ............ 707/100 |
| 2002/0120859 | A1 | | 8/2002 | Lipkin et al. | ................. 713/200 |
| 2003/0018950 | A1 | | 1/2003 | Sparks et al. | ............... 717/100 |
| 2003/0023617 | A1 | * | 1/2003 | Hunt et al. | ................... 707/202 |
| 2003/0074358 | A1 | | 4/2003 | Sarbaz et al. | ................. 707/10 |
| 2003/0120665 | A1 | * | 6/2003 | Fox et al. | ..................... 707/100 |
| 2003/0149689 | A1 | | 8/2003 | Chow et al. | .................... 707/3 |
| 2004/0006549 | A1 | | 1/2004 | Mullins et al. | ................. 707/1 |
| 2004/0034651 | A1 | * | 2/2004 | Gupta et al. | ................. 707/102 |
| 2004/0088687 | A1 | | 5/2004 | Dalton et al. | ............... 717/141 |
| 2005/0149552 | A1 | * | 7/2005 | Chan et al. | ................... 707/102 |
| 2006/0167856 | A1 | * | 7/2006 | Angele et al. | .................. 707/3 |
| 2006/0173865 | A1 | * | 8/2006 | Fong | ......................... 707/100 |

FOREIGN PATENT DOCUMENTS

WO WO2004/010319 1/2004

\* cited by examiner

*Primary Examiner*—Hosain T Alam
*Assistant Examiner*—Syling Yen
(74) *Attorney, Agent, or Firm*—Yee & Associates, P.C.; Martin J. McKinley

(57) ABSTRACT

A method, system, and computer instructions for providing a single set of object relational mappings across different instances of the same schemas. With the present invention, multiple datasources are first configured for class (or set of object definitions). A mapping identifier is set at runtime, wherein the mapping ID is used to access the correct datasource. Mapping code is then generated from the datasource based on the mapping identifier. A schema identifier is acquired from the generated mapping code and prepended to tables in the in the SQL generated code. The schema name is used to connect to the correct schema within a datasource. The mapping ID is also used to access the correct JNDI name to access the correct data source which represents a physical database.

6 Claims, 15 Drawing Sheets

```
<ejbBindings ....>
...
<cmpConnectionFactory xmi : id="UniqueID" jndiName="jdc/dsname" resAuth="Container"/>
...
</ejbBindings>
```

```
<ejbBindings ...>
...
<cmpConnectionFactoryProfile default="ID-1">
    <cmpConnectionFactory xmi : id="ID-1" jndcName="jdbc/dsname1" resAuth="Container"/>
    <cmpConnectionFactory xmi : id="ID-2" jndcName="jdbc/dsname2" resAuth="Container"/>
    <cmpConnectionFactory xmi : id="ID-3" jndcName="jdbc/dsname3" resAuth="Container"/>
    ...
    <cmpConnectionFactory xmi : id="ID-N" jndcName="jdbc/dsnameN" resAuth="Container"/>
</cmpConnectionFactoryProfile>
...
</ejbBindings>
```

WSMapperHelper.setMappingId(cmpName,mapping-id);

String mapping-id = WSMapperHelper.
getMappingId(ejb(Context.getCallerPrincipal();
   *812*               *822*
WSMapperHelper.setMappingId(cmpName,mapping-id);
      *816*               *818*     *820*

FIG. 9A
Prior Art

```java
package com.deploybook.trade.ejb;
import javax.ejb.CreateException;
/**
 * Bean implementation class for Enterprise Bean: TransationHistory
 */
public abstract class TransactionHistoryBean implements javax.ejb.EntityBean {
    private javax.ejb.EntityContext myEntityCtx;
    /**
     * setEntityContext
     */
    public void setEntityContext(javax.ejb.EntityContext ctx) {
        myEntityCtx = ctx;
    }
    /**
     * getEntityContext
     */
    public javax.ejb.EntityContext getEntityContext() {
        return myEntityCtx;
    }
    /**
     * unsetEntityContext
     */
    public void unsetEntityContext() {
        myEntityCtx = null;
    }
    /**
     * ejbActivate
     */
    public void ejbActivate() {
    }
    /**
     * ejbCreate
     */
    public com.deploybook.trade.ejb.TransactionHistoryKey ejbCreate(jave.lang.String transactionId) throws javax.ejb.CreateException {
        setTransactionId(transactionId);
        return null;
    }
```

FIG. 9A
(cont'd)

```
/**
* Method ejbCreate.
* @param transactionId
* @param price
* @param quantity
* @param success
* @param transaction
* @param account
* @param symbol
* @return TransactionHistoryKey
* @throws CreateException
*/
public com.deploybook.trade.ejb.TransactionHistoryKey ejbCreate(java.lang.String
transactionId, double price, double quantity, String success, String transaction, AccountLocal
account, String symbol) throws CreateException
{
    setTransactionId(transactionId);
    setPrice(price);
    setQuantity(quantity):
    setSuccess(success);
    setTransaction(transaction);
    setSymbol(symbol);
    return null;
}
/**
* Method ejbPostCreate.
* @param transactionId
* @param price
* @param quantity
* @param success
* @param transaction
* @param account
* @param symbol
* @throws CreateException
*/
public void ejbPostCreate(java.lang.String transactionId, double price, double quantity, String
success, String transaction, AccountLocal account, String symbol) throws CreateException
    {
        setAccount(account);
    }
/**
 * ejbLoad
 */
public void ejbLoad() {
}
/**
 * ejbPassivate
 */
```

FIG. 9A (cont'd)

```
public void ejbPassivate() {
}
/**
 * ejbPostCreate
 */
public void ejbPostCreate (java.lang.String transactionId) throws javax.ejb.CreateException {
}
    /**
     * ejbRemove
     */
    public void ejbRemove() throws javax.ejb.RemoveException {
    }
    /**
     * ejbStore
     */
    public voic ejbStore() {
    }
    /**
     * Get accessor for persistent attribute: transaction
     */
    public abstract java.lang.String getTransaction();
    /**
     * Set accessor for persistent attribute: transaction
     */
    public abstract void setTransaction(java.lang.String newTransaction);
    /**
     */ Get accessor for persistent attribute: price
    public abstract double getPrice();
    /**
     * Set accessor for persistent attribute: price
     */
    public abstract void setPrice(double newPrice);
    /**
     * Get accessor for persistent attribute: quantity
     */
    public abstract double getQuantity();
    /**
     * Set accessor for persistent attribute: quantity
     */
    public abstract void setQuantity(double newQuantity);
    /**
     * Get accessor for persistent attribute: success
     */
    public abstract java.lang.String getSuccess();
    /**
     * Set accessor for persistent attribute: success
     */
```

FIG. 9A
(cont'd)

```java
public abstract void setSuccess(java.lang.String newSuccess);
/**
 * Get accessor for persistent attribute: transactionId
 */
public abstract java.lang.String getTransactionId();
/**
 * Set accessor for persistent attribute: transactionId
 */
public abstract void SetTransactionId(java.lang.String newTransactionId);
/**
 * This method was generated for supporting the relationship role named account.
 * It will be deleted/edited when the relationship is deleted/edited.
 */
public abstract com.deploybook.trade.ejb.AccountLocal getAccount();
/**
 * This method was generated for supporting the relationship role named account.
 * It will be deleted/edited when the relationship is deleted/edited.
 */
public abstract void setAccount (com.deploybook.trade.ejb.AccountLocal anAccount);
/**
 * Get accessor for persistent attribute: symbol
 */
public abstract java.lang.String getSymbol();
/**
 * Set accessor for persistent attribute: symbol
    public abstract void setSymbol(java.lang.String newSymbol);
}
```

FIG. 9B
Prior Art

```java
/**
 * FindByPrimaryKey
 */
public javax.resource.cci.Record FindByPrimaryKey(IndexedRecord inputRecord,
Object connection, WSInteractionSpec interactionSpec) throws DataStoreAdapterException {
    PreparedStatement pstmt = null;
    ResultSet result = null;
    try {
        pstmt = preparedStatement(connection,"SELECT T1.TRANSACTIONID,
            T1.TRANSACTION, T1.SYMBOL, T1.PRICE, T1.QUANTITY, T1.SUCCESS, T1.ACCOUNTID
            FROM CHAPTER10.TRANSACTIONHISTORY T1 WHERE T1.TRANSACTIONID = ?");
        // For column TRANSACTIONID
        {
            String tempString;

tempString=(String)inputRecord.get(0);
            if (tempString ! = null)
                pstmt.setString(1,tempString);
            else
                pstmt.setNull(1,java.sql.Types.VARCHAR);
        }
        result = pstmt.executeQuery();

}
    catch (SQLException e) {
        throw new DataStoreAdapterException("DSA_ERROR", e , this.getClass());
    }
    return createCCIRecord(connection, result);
}
```

FIG. 9C

```
//Obtained from thread locale storage

String schemaName = WSMapperHelper.getCurrentMappingId(cmpName);
String sqlName = "SELECT T1.TRANSACTIONID, T1.TRANSACTION, T1.SYMBOL, T1.PRICE
T1.QUANTITY, T1.SUCCESS, T1.ACCOUNTID FROM " + schemaName + "
TRANSACTIONHISTORY T1 WHERE T1.TRANSACTIONID = ?"
pstmt = prepareStatement(conenction, sqlName);
```

```
//Obtained from thread locale storage

String schemaName = WSMapperHelper.getCurrentMappingId(cmpName);

DataSource ds = ctx.lookup(getJNDIForSchema(schemaName));
Connection conn = ds.getConnection();
```

920, 924, 922, 928, 926, 930, 932

HAVING A SINGLE SET OF OBJECT RELATIONAL MAPPINGS ACROSS DIFFERENT INSTANCES OF THE SAME SCHEMAS

BACKGROUND OF THE INVENTION

1. Technical Field

The present invention relates generally to an improved data processing system. In particular, the present invention relates to a method, apparatus, and computer instructions for providing a single set of object/relational (OR) mappings across different instances of the same relational database schemas.

2. Description of Related Art

Object-relational mapping tools are used to facilitate development of application programs that utilize a relational database. A relational database stores data in tables having rows (records) and columns (fields). The tables are usually interrelated, and thus, there is a logical structure imposed on the database. This logical structure is known as a schema. However, developers who use object oriented programming languages work with objects rather than tables. Objects represent data differently than tables. As such, object-relational mapping tools are used to map objects and object relationships to tables and table relationships. Object-relational-mapping tools read meta-data information from the database schema and object model and automatically generate source code to connect them. This source code contains a number of classes that manages moving data between the data and objects.

Much like a table is a template for rows, a class is a template for objects. Classes are mapped to tables to allow in memory objects to represent rows in a table. Having one set of classes for multiple data sources is necessary in many applications. However, with existing object relational (OR) mapping technology, there is currently no easy way to have one set of classes for multiple data sources, other than to create a set of classes for each set of tables. Thus, one set of domain classes must be mapped to one set of relational tables. This requirement is problematic when a relational database is partitioned. Many companies divide up their databases by creating copies of the same schema across many boxes and partitioning the data based on a set of users. Requests for data are then routed to the database based on the requesting user. For example, FIG. 1 illustrates an example of partitioned data in two physical databases, DB1 102 and DB2 104. Each class in application 106 is mapped to a relational schema instance. For example, class 1 108 is mapped to schema instance 1 110, class 2 112 is mapped to schema instance 2 114, etc. In this situation where multiple copies of a schema are present, each relational schema must be mapped to a different set of classes, even though the schema may just be an instance of the same data model. These additional mappings require extra work, repetition, and coding.

In order to reduce the number of mappings in the situation above, applications need to know the location of a particular database based on the end user. For example, based on a user ID, an application knows that a box contains the database with a particular user's data. Although some existing applications comprise routing logic for identifying the database containing a particular user's data, this method to reduce the number of mappings still has several drawbacks. For example, in Java 2, Enterprise Edition (J2EE) environments, resource references are bound at deployment time (i.e., at the time the application is installed). Thus, the total number databases defined in the local namespace must be known ahead of time if a custom code is used to implement the user to database mapping. In addition, as OR mappers are bound to one data source at deployment time, one set of objects per database schema would be needed to make this work. This is an unrealistic deployment nightmare if there are many schemas.

Therefore, it would be advantageous to have a method and apparatus for providing a single set of object relational mappings across different instances of the same schemas.

BRIEF SUMMARY OF THE INVENTION

The present invention provides a method, system, and computer instructions for providing a single set of object relational mappings across different instances of the same schemas. With the present invention, multiple datasources are first configured for an application. A mapping identifier is set at runtime, wherein the mapping ID is used to access the correct datasource. Mapping code is then generated by the mapping tool based on the mapping identifier. A schema identifier is acquired by the generated mapping code and prepended to tables in the SQL portions of the generated code. The schema name is used to connect to the correct schema.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7A illustrates a portion of a known .XMI file showing a CMP bound to one data source at runtime;

FIG. 7B illustrates an example .XMI file used for configuring multiple data sources for an object in accordance with the present invention;

FIG. 8A illustrates an exemplary method for setting the mapping ID at runtime in accordance with the present invention;

FIG. 8B illustrates an exemplary method for setting the mapping ID at runtime in accordance with an alternative embodiment of the present invention;

FIG. 9A illustrates a known CMP bean mapping;

FIG. 9B illustrates a known method for querying the CMP bean;

FIG. 9C illustrates an exemplary method for retrieving the current mapping ID to obtain the correct schema instance in accordance with the present invention;

FIG. 9D illustrates an exemplary method for using the schema name to obtain the correct JDNI name for the connections in accordance with the present invention;

DETAILED DESCRIPTION OF THE INVENTION

Figure 1:
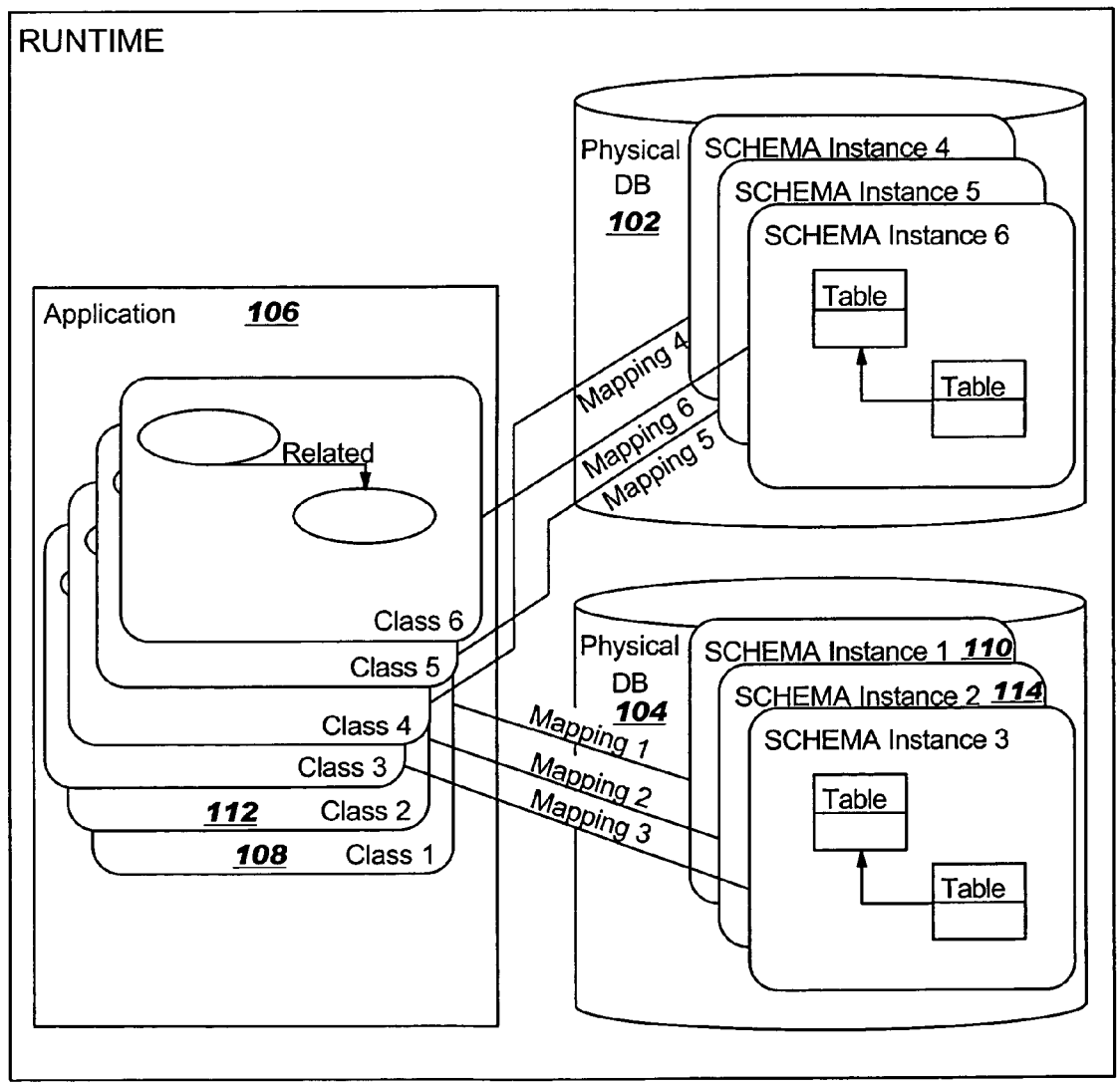
FIG. 1 depicts a diagram of known object relational mappings in a data processing system at runtime.
Figure 2:
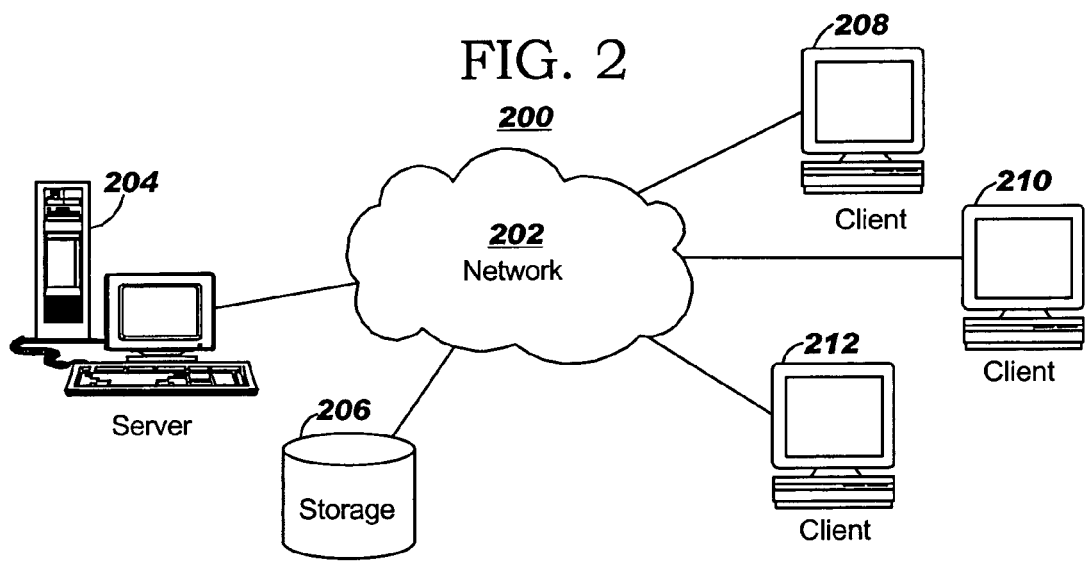
FIG. 2 depicts a representation of a network of data processing systems in which the present invention may be implemented.

With reference now to the figures, FIG. 2 depicts a pictorial representation of a network of data processing systems in which the present invention may be implemented. Network data processing system 200 is a network of computers in which the present invention may be implemented. Network data processing system 200 contains a network 202, which is the medium used to provide communications links between various devices and computers connected together within network data processing system 200. Network 202 may include connections, such as wire, wireless communication links, or fiber optic cables.

In the depicted example, server 204 is connected to network 202 along with storage unit 206. Server 204 may be a WebSphere™ Application Server (WAS), which is a product of International Business Machines Corporation. In addition, clients 208, 210, and 212 are connected to network 202. These clients 208, 210, and 212 may be, for example, personal computers or network computers. In the depicted example, server 204 provides data, such as boot files, operating system images, and applications to clients 208-212. Clients 208, 210, and 212 are clients to server 204. Network data processing system 200 may include additional servers, clients, and other devices not shown. In the depicted example, network data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 200 also may be implemented as a number of different types of networks, such as for example, an intranet, a local area network (LAN), or a wide area network (WAN). FIG. 2 is intended as an example, and not as an architectural limitation for the present invention.

Figure 3:
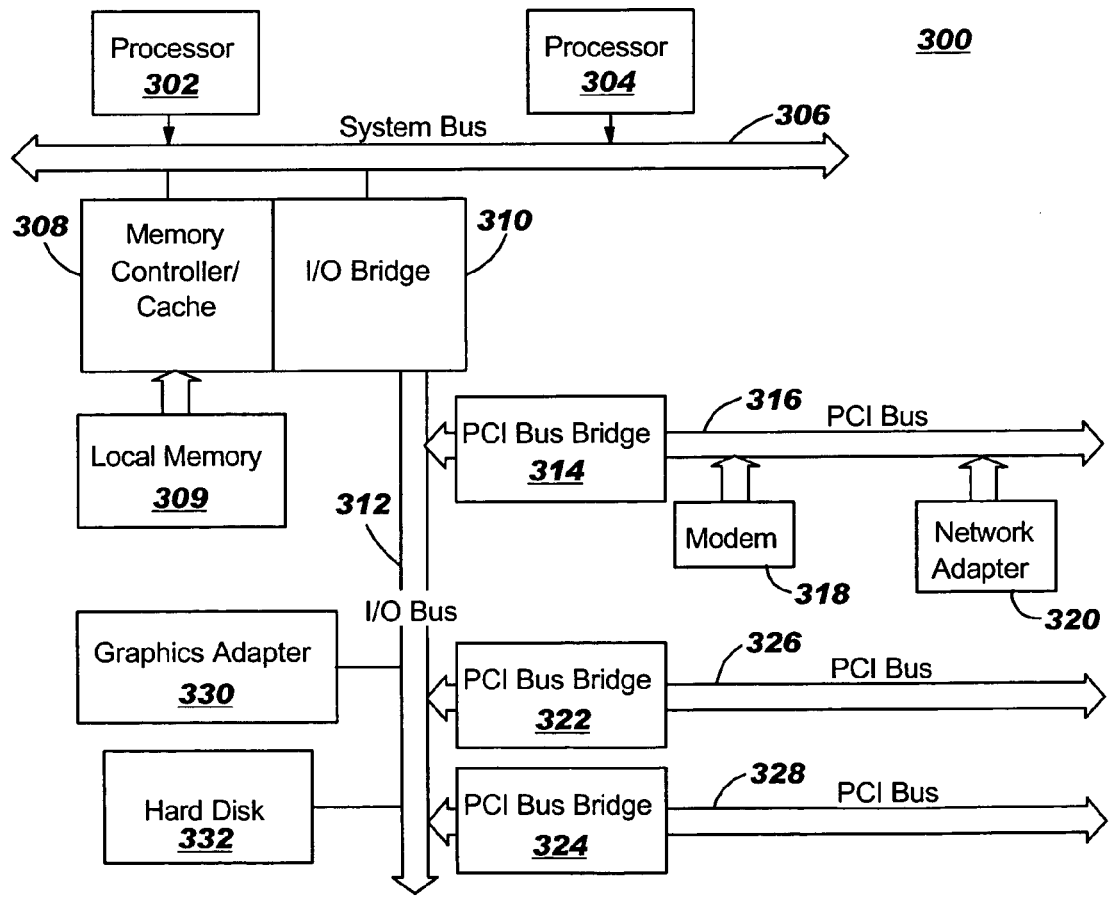
FIG. 3 is a block diagram of a data processing system that may be implemented as a server in accordance with a preferred embodiment of the present invention.

Referring to FIG. 3, a block diagram of a data processing system that may be implemented as a server, such as server 204 in FIG. 2, is depicted in accordance with a preferred embodiment of the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communications links to clients 208-212 in FIG. 2 may be provided through modem 318 and network adapter 320 connected to PCI local bus 316 through add-in connectors.

Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM eServer pSeries system, a product of International Business Machines Corporation in Armonk, N.Y., running the Advanced Interactive Executive (AIX) operating system or LINUX operating system.

Figure 4:
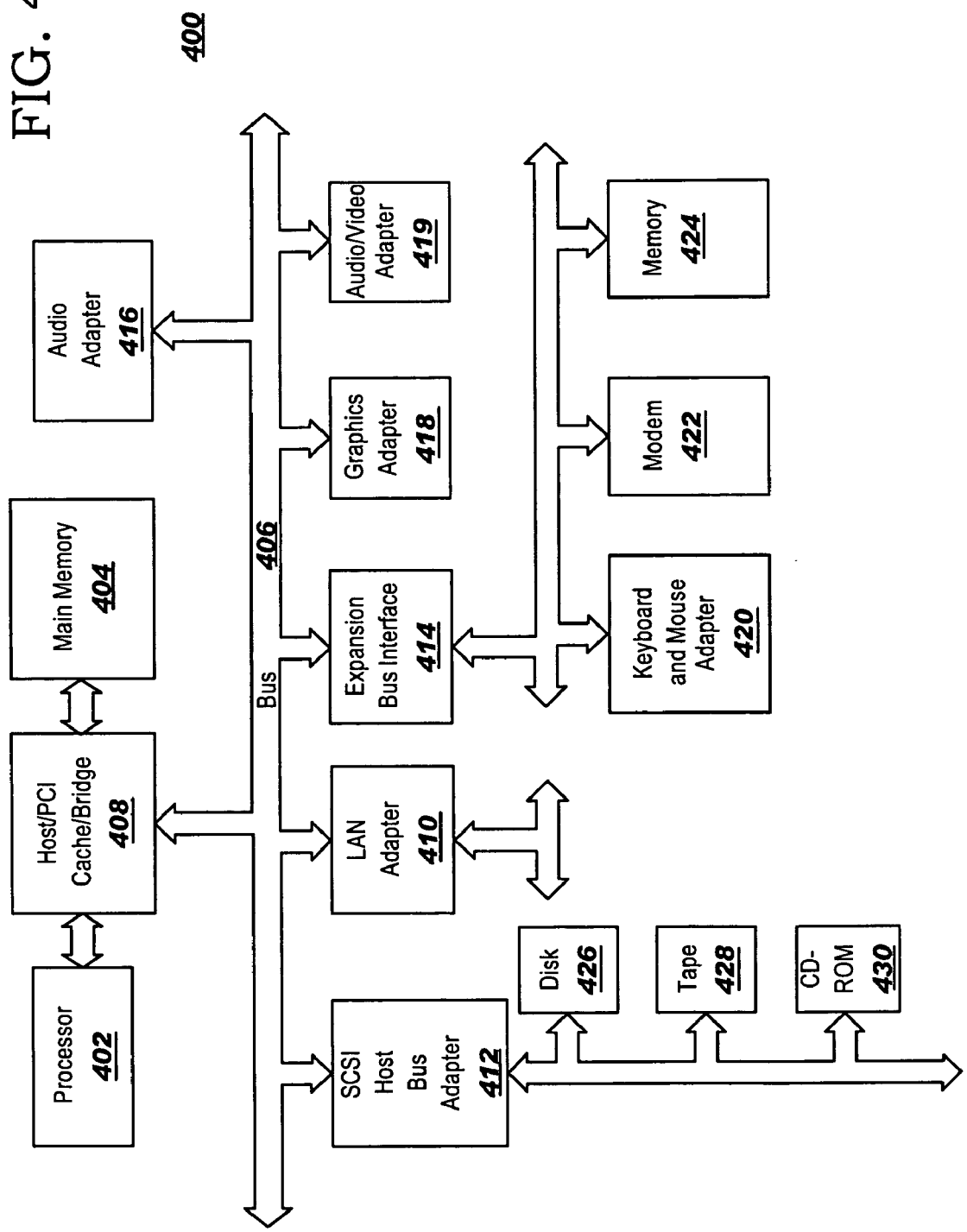
FIG. 4 is a block diagram illustrating a data processing system in which the present invention may be implemented.

With reference now to FIG. 4, a block diagram illustrating a data processing system is depicted in which the present invention may be implemented. Data processing system 400 is an example of a client computer. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 306 may be made through direct component interconnection or through add-in boards. In the depicted example, local area network (LAN) adapter 410, small computer system interface (SCSI) host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 314 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as Windows$^M$ XP, which is available from Microsoft Corporation. An object oriented programming system such as Java may run in conjunction with the operating system and provide calls to the operating system from Java programs or applications executing on data processing system 400. "Java" is a trademark of Sun Microsystems, Inc. Instructions for the operating system, the object-oriented programming system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash read-only memory (ROM), equivalent nonvolatile memory, or optical disk drives and the like, may be used in addition to or in place of the hardware depicted in FIG. 4.

Also, the processes of the present invention may be applied to a multiprocessor data processing system.

As another example, data processing system 400 may be a stand-alone system configured to be bootable without relying on some type of network communication interfaces. As a further example, data processing system 400 may be a personal digital assistant (PDA) device, which is configured with ROM and/or flash ROM in order to provide non-volatile memory for storing operating system files and/or user-generated data.

The depicted example in FIG. 4 and above-described examples are not meant to imply architectural limitations. For example, data processing system 400 also may be a notebook computer or hand held computer in addition to taking the form of a PDA.

The present invention provides an improved method, apparatus, and computer instructions for mapping a set of classes to a datasource in an object relational system. The mechanism of the present invention allows multiple schemas that are instances of the same data model to be mapped to a single set of classes. A class in an object oriented programming language is a template that represents a set of objects. The present invention offers an advantage over existing object relational mapping methods which require that each relational schema be mapped to a different set of classes, even though the schema may just be an instance of the same data model. In this manner, the present invention enables the creation of a set of classes mapped to different database schema instances with the same schema definition.

In the depicted examples, a single set of classes is mapped to multiple schema instances by first configuring multiple datasources for a class. For example, a user may define multiple entries in a file, such as an .XMI file, where each entry is keyed with an identifier, or mapping ID. One entry in the file is specified as a default. This handles the case where the schema may be physically located on different machines.

The mechanism of the present invention also provides the ability to map a set of classes once at development time and set multiple mappings through a runtime facility to access the correct schema instances. For example, a user may set a mapping ID which is used to obtain the correct schema instance identifier. Alternatively, the mapping ID may be set based on a user who is authenticated by allowing the user to be administratively associated with the mapping ID. At development time, this mapping is performed once and maps a single set of classes to a model schema. At runtime, this mapping may be used to allow for setting multiple mappings between a set of classes and multiple schema instances at runtime. The mapping method sets the mapping ID to the current running thread or context.

Once the set of classes is mapped to the schema, mapping code is then generated from the database based on the mappings. This generated mapping code allows for obtaining the correct schema instance based on a token associated with the request that identifies the user or based on a mapping set explicitly in code. The schema name may then be dynamically pre-pended onto the appropriate table section of the SQL statement based on the value passed in the request. The schema name may also be used by the generated code to connect to the correct database.

Next, a specific implementation of the present invention will be described in which multiple datasources are configured for performing the present invention within a WebSphere™ Application Server (WAS) environment. WAS is a J2EE application server that provides an operating environment for e-business applications that perform transactions over the Internet. Java is an object oriented programming language and environment focusing on defining data as objects and the methods that may be applied to those objects. Java supports only a single class inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

The Java virtual machine (JVM) is a virtual computer component that resides only in memory. The JVM allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

In Java, independent Java program modules that are called for and executed are referred to as JavaBeans. JavaBeans have been primarily used for developing user interface on the client side. A server side counterpart of JavaBeans is present. This counterpart is referred to as Enterprise JavaBeans (EJBs). An EJB is a software component in Java 2, Enterprise Edition (J2EE) Platform. This platform provides a pure Java environment for developing and running distributed applications. EJBs are written as software modules that contain the business logic of the application. These EJBs reside in and are executed in a runtime environment called an "EJB container", which provides common interfaces and services to the EJB. These services include security and transaction support.

Container-managed persistent (CMP) entity EJBs are in essence wrappers for persistent data with additional support for transaction control and security. CMP is an example of an OR Mapper. The persistent data typically takes the form of relational databases. The EJB specification, version 2.0 specification, defines a high-level interface for various types of web-based application services. One of the most complex of these types of services is a container-managed persistent (CMP) entity bean. A CMP entity bean represents a unit of data held in a persistent data store, but which the end user may treat as a Java object. In these examples, the end user is typically an applications programmer. An applications server provider provides a mechanism in the form of code to implement the EJB specification for CMP entity beans and forms a bridge between the interfaces seen by the application programmer and various persistent data stores.

Although the examples in the present invention are presented in terms of WAS, it should be clear that the present invention is not limited to this particular implementation and other implementations of the present invention may be used without departing from the spirit and scope of the present invention.

Figure 5:
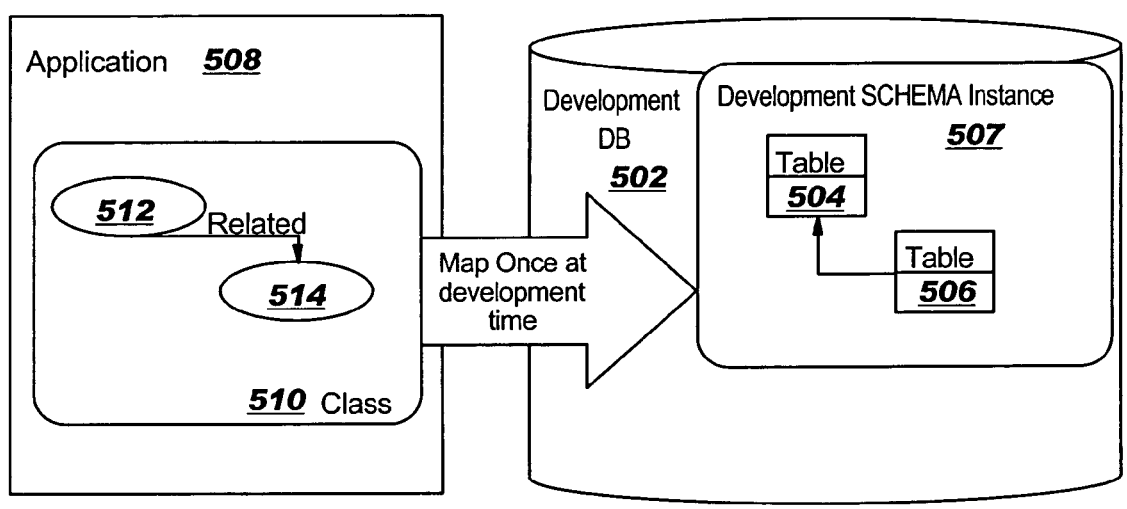
FIG. 5 is a diagram illustrating an exemplary object relational mapping in a container managed persistence (CMP) architecture at development time in accordance with the present invention.

As previously mentioned, the mechanism of the present invention allows to mapping a set of classes once at development time and set multiple mappings through a runtime facility to access the correct schema instances. FIG. 5 is a diagram illustrating an exemplary mapping in an object relational system at development time in accordance with the present invention. The object relational system is a system in which applications operate on objects that are mapped to the corresponding data representations (e.g., records in tables) in a database. In particular, a CMP architecture is shown in FIG. 5. The database illustrated in FIG. 5 may be implemented in a storage device, such as storage unit 206 in FIG. 2.

Development database 502 is a relational database and is comprised of a plurality of tables, such as tables 504 and 506, that are linked based on common attributes within the tables. These interrelated tables comprise a logical structure, or schema, such as schema 507, of development database 502. Application 508 may contain multiple classes, such as class 510. Class 510 may contain multiple objects, such as objects 512 and 514. Each class within application 508 is mapped to a development schema instance within development database 508. For example, class 510 is mapped to development schema instance 516. As shown, this mapping is performed once at development time. This mapping allows application 508 to read the database schema information and generate source code from the database. This source code contains a number of classes whose interrelationships reflect the logical structure, or schema, of the database.

Figure 6:
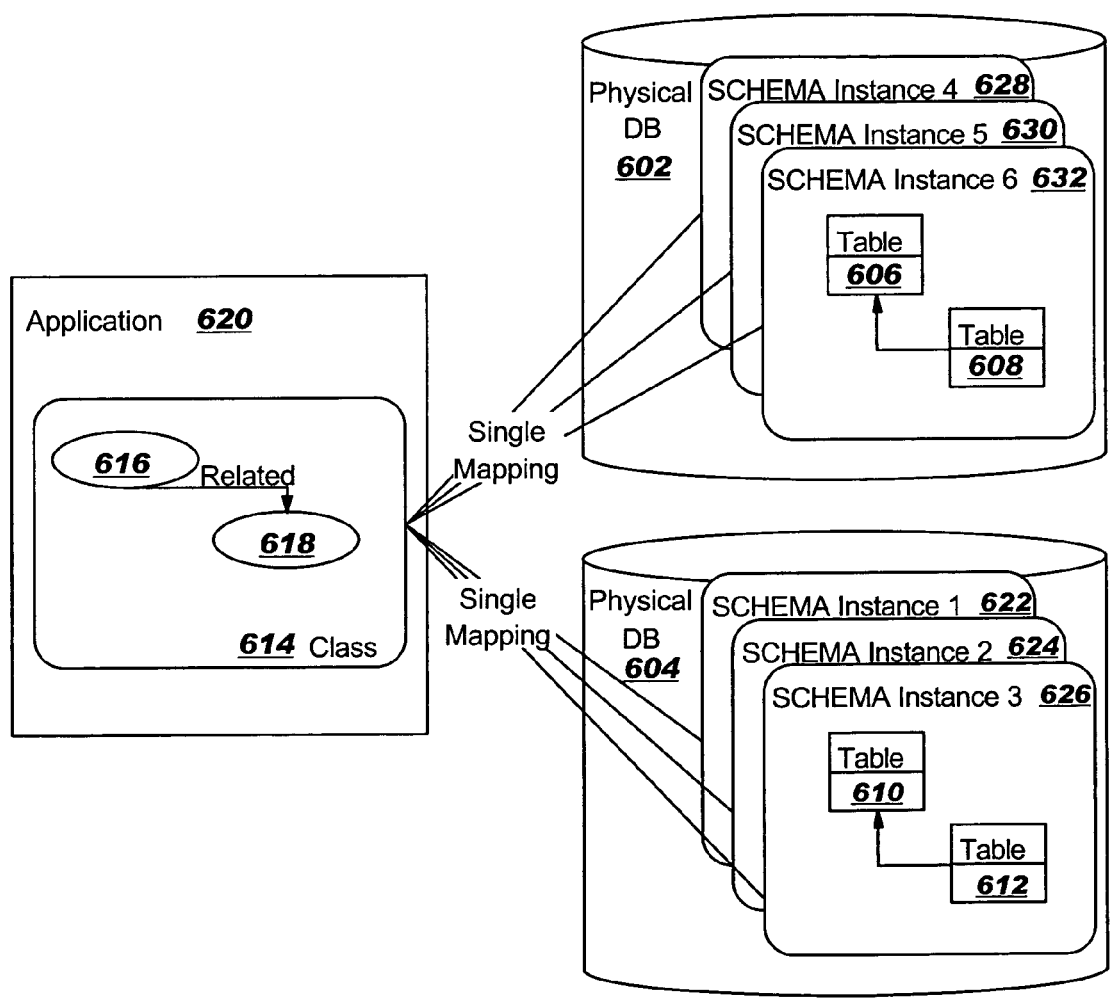
FIG. 6 is a diagram of exemplary object relational mappings in a CMP architecture at runtime in accordance with the present invention.

As the mapping in FIG. 5 is performed at development time, the mappings illustrated in FIG. 6 are set at runtime. FIG. 6 is a diagram of exemplary object relational mappings in a CMP architecture at runtime in accordance with the present invention. The multiple mappings shown in FIG. 6 are set through a runtime facility and are used to access the correct schema instances.

Like development database 502 in FIG. 5, physical databases 602 and 604 are comprised of a plurality of tables, such as tables 606-612. Class 614, which contains multiple objects, such as objects 616 and 618, within application 620 is mapped to multiple instances of a schema within physical databases 602 and 604. For example, class 614 is mapped to schema instances 622-632. These multiple mappings, which bind a class to many data sources, are set at runtime by a user.

When mapping to different schemas, one must take into account that these schemas may be located across different machines. Thus, there should be a way to configure classes that are smart enough to locate the schema at runtime. FIG. 7 addresses this issue. In this figure, a portion of a known .XMI file creating an EJB binding of one data source to a CMP bean at runtime is shown. An XMI file is a configuration file WebSphere Application Server uses to store information that will be used at deploy time (or application installation time) to connect references to databases to the actual physical location they are located. The .XMI file shown in FIG. 7A may be implemented at development time and stored with the application so that WebSphere Application Server can use it to find the datasource.

A Java Naming and Directory Interface (JNDI) is an application programming interface (API) which provides a common-denominator interface to many existing naming services. JNDI assists distributed applications in helping components in the distributed applications locate each other. In a WebSphere Application Server, CMPs typically access the appropriate JNDI context of the resource (e.g., the database) to access the data. However, only one JNDI name may currently be mapped to the Entity EJB. Thus, a CMP bean is bound to one data source at runtime. For example, .XMI file 700 is an ibm-ejb-jar-bnd.xmi file. .XMI file 700 is used to create an EJB binding for a resource. As shown, the resource is bound to the CMP bean through a unique ID 702 and JNDI name 704.

In contrast, FIG. 7B is an example implementation of an .XMI file for configuring multiple data sources for an object in accordance with the present invention. In particular, FIG. 7B illustrates that an Entity EJB may be mapped to more than one data source, represented by multiple JNDI names, at runtime.

In order to implement the multiple data source configuration, a user first defines multiple entries in a file, such as .XMI file 710. .XMI file 710 is used to create an EJB binding of multiple data sources to a CMP bean. Each entry in .XMI file 710 includes a mapping ID and a JNDI name of the resource (e.g., the database) to access the database. For example, .XMI file 710 includes multiple entries identified by mapping ID, such as ID-1 712, ID-2 714, ID-3 716, etc. Each entry in .XMI file 710 also has a JNDI name, such as jdbc/dsname1 718 for ID-1 712, jdbc/dsname2 720 for ID-2 714, etc. One entry in the file is specified as the default entry. In this example, entry ID-1 712 is specified as the default 722. Thus, .XMI file 710 provides the ability to create a set of entity beans mapped to different databases with the same schema definition. In this manner, a CMP bean may be bound to multiple datasources.

FIGS. 8A-8B illustrate exemplary methods for setting the mapping ID at runtime in accordance with the present invention. The methods shown in these figures provide a user with the ability set multiple mappings through a runtime facility in order to be able to access the correct resource.

In setting multiple mappings, an ideal situation is to expose an application programming interface (API) programmatic method where the user can set the mapping ID on the call. For example, the programmatic method shown in FIG. 8A is implemented using a global WebSphere helper that enables the user to set this mapping ID. WSMapperHelper 802 is used to set the mapping ID. As the user provides the values of CMP bean name 804 and mapping ID 806, the setMappingID function 808 sets the mapping ID at runtime.

Although setting the mapping ID in this manner provides the user with the ability set multiple mappings at runtime in order to be able to access the correct resource, this particular method breaks portability of the J2EE code. One of the advantages of J2EE is one can write an application using one application server, such as WebSphere Application Server, and have the same application run on another J2EE Application server with little or no changes. Depending on the requirement, this consequence may not matter if the application is not deployed outside of WebSphere. However, adding certain features to an application server may mean that it makes it into the J2EE specification at some future point. This method will at least allow a user to map a set of entity beans once at development time and also allow the entity bean to access multiple databases at runtime.

Furthermore, applications using the same mapping ID may share connection pooling. Connection pooling is a technique used for sharing server resources among requesting clients. In this situation, an application call may be externalized from the application in a helper so that the session bean code is portable. The value would be stored in the current thread of execution using some context. A context in J2EE is used to refer to some object that is passed implicitly through the coding layer without having to explicitly define it in a method definition. Instead, the context is stored in an area which is associated with a thread. A thread is an operating system feature representing a particular instance of running execution. Because a thread handles one request at a time, one can use the ability to associate data with the thread to pass the information between application layers.

Another method for setting the mapping ID at runtime in accordance with the present invention is illustrated in FIG. 8B. In this method, WebSphere Security is tied in to the WSMapperHelper function. The requesting user is first tied to a mapping ID. For example, mapping-ID 810 is obtained through a getMappingID function 812 using WSMapperHelper 814. In order to obtain the mapping ID, get mapping-ID 812 uses the user credentials to identify the requesting user.

Once the mapping ID is obtained, WAS may then maintain a mapping between the user (or role) and the particular mapping ID. For example, WebSphere helper WSMapperHelper 816 is used to set the mapping ID. The user provides the values of CMP bean name 818 and mapping ID 820, and the setMappingID function 822 sets the mapping ID at runtime. WAS may set this mapping implicitly inside the code generated from the mapping. It should be noted that this association between the mapping ID and the user/role would need to be a new administrative feature on the server.

FIGS. 9A-9D are provided to illustrate an example CMP bean and query, and how the generated mapping code is used by the container to determine which database to physically go to based on the mappings. In these examples, the mapping identifier is dynamically pre-pended to the tables in the datasource based on the token or value passed in request. In particular, a known CMP bean is depicted in FIG. 9A. FIG. 9A shows a transaction history bean that a user may query to access data in the datasource.

FIG. 9B illustrates a known method for querying the CMP bean. A query denotes a set of commands for retrieving stored data from a database. A query may include commands to store, retrieve, and delete data using high-level query languages such as the Structured Query Language (SQL). The example method in FIG. 9B is shown to be implemented in a WebSphere Application Server, such as server 204 in FIG. 2.

In this illustrative example, SQL Select statement 902 queries a database table in FIG. 9A to obtain the transaction, transaction ID, symbol, prices, quantity, success, and account ID information from the bean. The Select statement is used to query the Chapter 10 table 904 to acquire the transaction, transaction ID, symbol, prices, quantity, success, and account ID information. However, as can be seen, Chapter 10 table 904 name is hard coded in the statement. By having the table name hardcoded in the query, only one set of classes may be mapped to the set of relational tables.

In order to allow multiple datasources to be mapped to a set of classes, the EJB container must know which database to go to access the data. The EJB container may use values passed in the generated mapping code to determine the correct schema to access. For example, FIG. 9C illustrates a method for retrieving the current mapping ID in order to access the appropriate schema instance in accordance with the present invention. Using the WebSphere helper WSMapperHelper 910, getCurrentMappingId function 912 is used to obtain the current mapping ID based on CMP name 914.

Once the schema name is obtained, the mapping ID associated with the schema name is dynamically pre-pended to the tables in the SQL statement based on the token or value passed in the helper command. The value of the mapping ID may be set in the manners illustrated in FIGS. 8A and 8B. The mapping ID may also be associated with the running thread (J2EE context). Schema name 916 may then be used in the SQL statement to query the CMP bean, without requiring the hardcoding of the datasource as described in FIG. 9B.

FIG. 9D illustrates a method for using the schema name to obtain the correct JDNI name for the connections in accordance with the present invention. This method provides the connection code with the ability to use the correct schema name and connect to the correct database.

Like the method in FIG. 9C, WebSphere helper WSMapperHelper 920 is used to obtain the current mapping ID based on CMP name 922 through getCurrentMappingId function 924. Context lookup 926 is then performed to obtain the correct JNDI 928 based on schema name 930. Based on the result, a getConnection function 932 is performed on the JNDI obtained. GetConnection function 932 is used to retrieve the connections needed to access the schema instance.

The examples described above solve the problems of loading data on the fly. However, object relational mappers often provide caching as a quality of service. If the application uses the CMP bean caching, it should be established that no data integrity issues are present.

Figure 10:
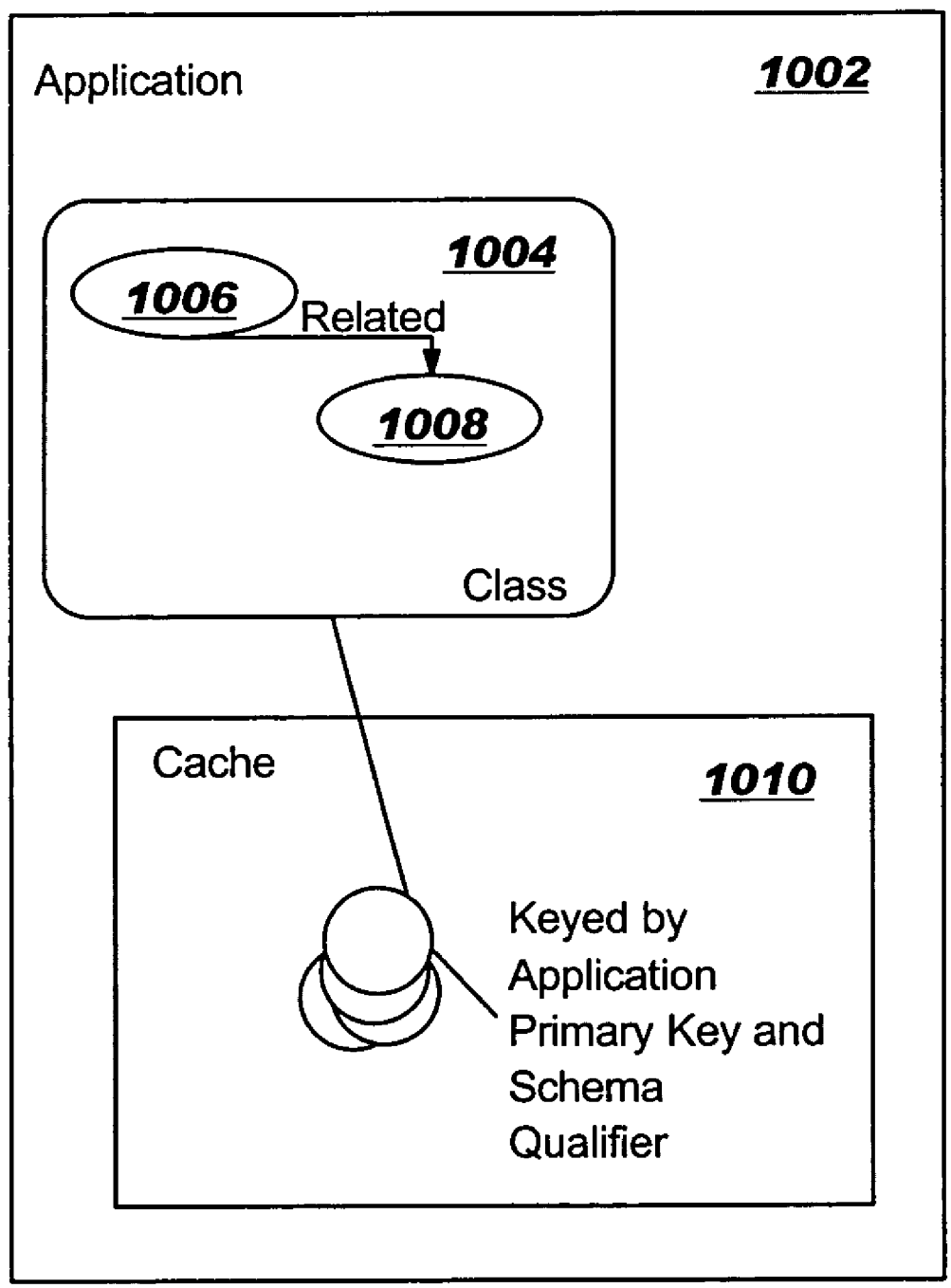
FIG. 10 is a diagram of an application with CMP bean caching in accordance with the present invention.

For example, FIG. 10 is a diagram of an application with CMP bean caching in accordance with the present invention. Application 1002 is shown to contain class 1004. Class 1004 may contain multiple objects, such as objects 1006 and 1008. Information from class 1004 may be stored in cache 1010. In order to ensure that data integrity is not an issue when caching is utilized, the schema ID may be added as an additional key to the cache. In this manner, the application server may retrieve the cached data by schema ID and primary key.

Figure 11:
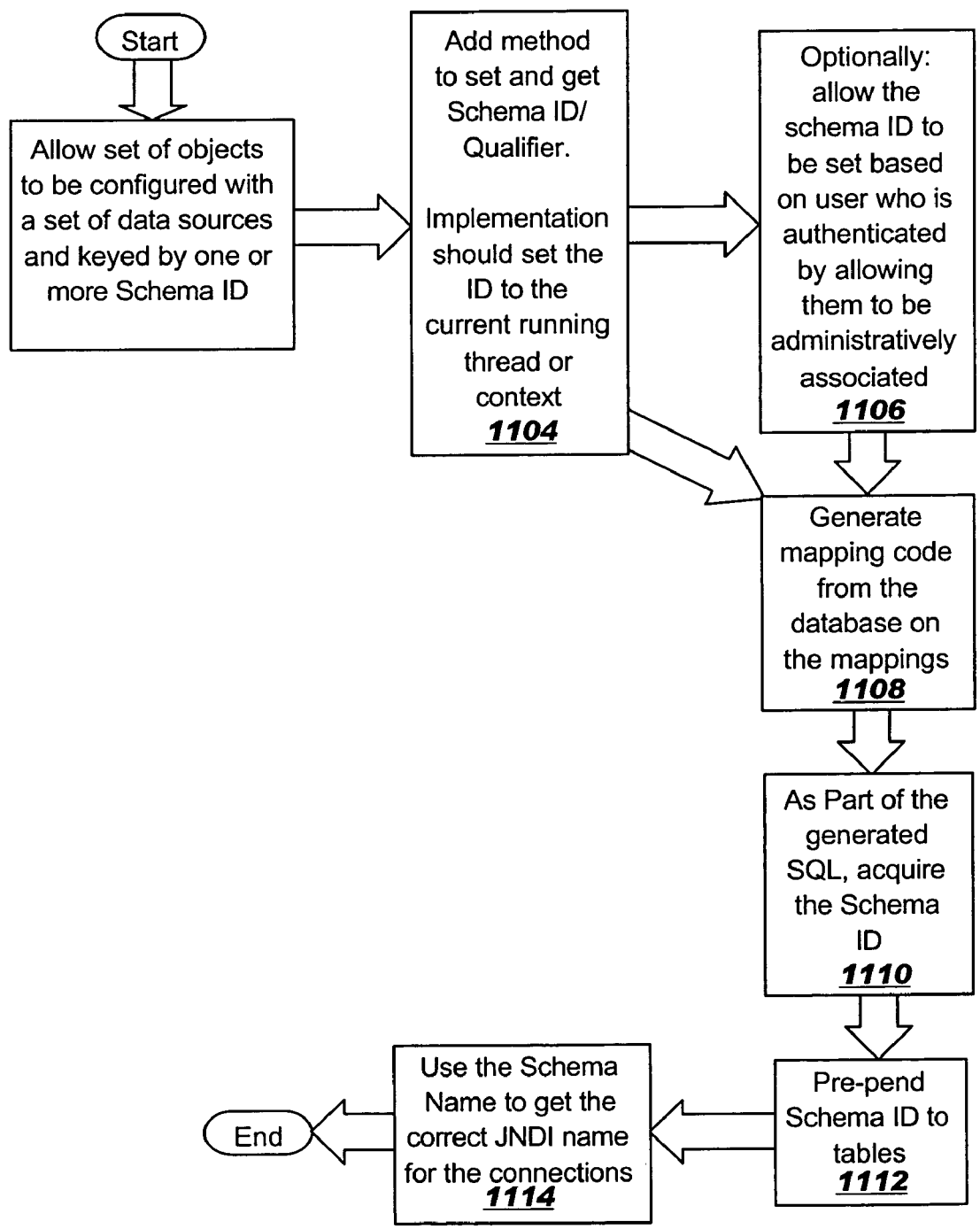
FIG. 11 is a flowchart of a process for providing a single set of OR mappings across different instances of the same schemas in accordance with the present invention.

FIG. 11 is a flowchart of a process for providing a single set of OR mappings across different instances of the same schemas in accordance with the present invention. The process illustrated in FIG. 11 may be implemented in a distributed data processing system, such as data processing system 200 in FIG. 2.

The process begins by first configuring multiple datasources for a class (step 1102). For example, using an application runtime administrative interface, a user may define multiple entries in a file, such as an .XMI file, where each entry is keyed with an identifier, or schema ID. Next, a method is performed for setting a mapping ID on the call (step 1104). This method may be performed through an internal application programming interface (API). In addition, the method sets the mapping ID to the current running thread or context. Optionally, the mapping ID may be obtained and set based on user credentials (step 1106). Once the user is identified, the user may be administratively associated with the mapping ID.

Once the set of objects is mapped to the schema, an object relational mapping code generator generates a mapping code from the mappings (step 1108). This generated mapping code allows for obtaining the correct schema instance ID based on a token associated with the request that identifies the user or based on a mapping set explicitly in code (step 1110). The schema identifier may be obtained using the internal API. Using the object relational mapping code generator, the schema name associated with the schema identifier may then be dynamically pre-pended to the appropriate table portion of the SQL statement based on the value passed in the request (step 1112).

The schema name may also be used by the generated code to connect to the correct database (step 1114), with the process terminating thereafter. In WAS, the schema name can be used to obtain the correct JNDI name for the connections.

Thus, the present invention provides a method, apparatus, and computer instructions for mapping a set of classes to a datasource in an object relational system. The advantages of the present invention should be apparent in view of the detailed description provided above. Many applications require one set of classes for multiple data sources. Existing OR mapping does not provide an easy way to do this other than create a set of objects for each set of tables. The present invention solves this problem by allowing multiple schemas that are instances of the same data model to be mapped to a single set of classes.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method in a data processing system for providing a single set of object relational mappings for a set of objects across different instances of same schemas, comprising:
    configuring multiple datasources for a class;
    setting a mapping identifier at runtime, wherein the mapping identifier is used by a computer to access a particular datasource of the multiple datasources;
    generating mapping code from the particular datasource based on the mapping identifier;
    acquiring a schema identifier from the generated mapping code;
    prepending the schema identifier to tables in a SQL generated code; and
    using a schema name associated with the schema identifier to connect to a schema instance in the particular datasource for accessing the particular datasource by the computer.

2. The method of claim 1, wherein configuring multiple datasources for a class includes defining multiple entries in a file, and wherein each entry of the multiple entries is keyed with an identifier.

3. The method of claim 1, wherein the mapping identifier is set to a current running thread.

4. The method of claim 3, wherein a context is associated with the current running thread, and wherein the context is used to associate data with the current running thread and pass the data between application layers.

5. The method of claim 1, wherein the schema name is used to obtain a correct name from a directory for connecting to the particular datasource.

6. The method of claim 1, wherein the mapping identifier is set using the mapping identifier associated with one of a requesting user or role.

* * * * *